United States Patent [19]
Ikeda et al.

[11] Patent Number: 5,454,171
[45] Date of Patent: Oct. 3, 1995

[54] CLOTHES DRYER AUTOMATICALLY DETERMINING A PERIOD OF CREASE-PREVENTING, INTERMITTENT OPERATION

[75] Inventors: Hiroshi Ikeda; Yoshiyuki Makino, both of Seto, Japan

[73] Assignee: Kabushiki Kaisha Toshiba, Kawasaki, Japan

[21] Appl. No.: 264,512

[22] Filed: Jun. 23, 1994

[30] Foreign Application Priority Data

Jun. 24, 1993 [JP] Japan ................... 5-153553

[51] Int. Cl.$^6$ ................................................ F26B 3/00
[52] U.S. Cl. .............................. 34/492; 34/491; 34/549; 34/554; 34/526
[58] Field of Search ................... 34/487, 491–493, 34/499, 549, 553, 554, 562, 572, 535, 526

[56] References Cited

U.S. PATENT DOCUMENTS 3,864,844  2/1975  Heidtmann ................... 34/45
4,531,305  7/1985  Nagayasu et al. ............ 34/31
4,763,425  8/1988  Grennan ...................... 34/552
5,301,438  4/1994  Tanaka et al. ................ 34/48

FOREIGN PATENT DOCUMENTS

0038561  10/1981  European Pat. Off. .
0104502   4/1984  European Pat. Off. .
2-2319    1/1990  Japan .
2088032   6/1982  United Kingdom .

*Primary Examiner*—Denise L. Gromada
*Attorney, Agent, or Firm*—Cushman Darby & Cushman

[57] ABSTRACT

A clothes dryer includes a drum for accommodating clothes to be dried, a heater and a fan for supplying hot air into the drum in a drying operation, and a temperature sensor sensing the temperature in the drum. A drying operation includes a drying step in which hot air is supplied into the drum and a cooling step in which the heater is deenergized. An intermittent operation is initiated upon completion of the drying operation. The intermittent operation is completed when the temperature sensed by the temperature sensor has reached a predetermined value set for preventing occurrence of creases in the clothes.

5 Claims, 9 Drawing Sheets

CLOTHES DRYER AUTOMATICALLY DETERMINING A PERIOD OF CREASE-PREVENTING, INTERMITTENT OPERATION

BACKGROUND OF THE INVENTION

1. Field of the Invention

This invention relates to a clothes dryer of the type executing a drying operation wherein hot air is supplied into a drum being turned with clothes accommodated therein and a subsequent intermittent operation of a predetermined period for force radiating heat from the clothes.

2. Description of the Prior Art

Conventional clothes dryers of the type described above comprise a drum accommodating clothes to be dried and turned by an electric motor, a fan and a heater for producing hot air and a control circuit. The control circuit controls the motor, the fan and the heater so that a drying operation and a subsequent intermittent operation are executed. The drying operation includes a drying step in which the hot air is supplied into the drum for drying the clothes and a subsequent cooling step in which room temperature air is supplied into the drum for reducing the high temperature therein. In the subsequent intermittent operation, for example, the fan and the drum are driven for ten seconds and interrupted for five minutes alternately repeatedly with the heater deenergized, so that heat is force radiated from the clothes in the drum. Consequently, the clothes can be kept soft and spontaneous firing of the clothes can be prevented even when the clothes are left in the drum at a stop. Since the clothes can be kept soft, creases can be prevented from being caused in the clothes.

In the conventional clothes dryers, however, a period of the intermittent operation is fixedly determined by a timer. The period of the intermittent operation is determined to be adapted for the worst conditions such as expected largest quantity of clothes to be dried. Consequently, the intermittent operation usually tends to be excessively prolonged, which results in waste of electrical energy and damage in the clothes.

SUMMARY OF THE INVENTION

Therefore, an object of the present invention is to provide a clothes dryer wherein the intermittent operation executed after completion of the cooling step of the drying operation, for preventing occurrence of creases in the clothes, can be prevented from being excessively prolonged so that waste of electrical energy and occurrence of damage in the clothes can be prevented.

The present invention provides a clothes dryer comprising an outer casing, a drum rotatably mounted in the outer casing for accommodating therein clothes to be dried, drum driving means for driving the drum, a fan for providing a flow of air flowing through the interior of the drum, fan driving means for driving the fan, a heater for heating the air supplied into the drum by the fan, and temperature sensing means for sensing the temperature in the drum, thereby generating a temperature signal indicative of the sensed temperature. First control means is provided for controlling the drum driving means, the fan driving means and the heater so that the drum and the fan are driven in a drying operation step in a state that the heater is energized and so that, after execution of the drying step, the drum and the fan are driven for a predetermined period of time in a cooling step in a state that the heater is deenergized. Second control means is provided for controlling the drum driving means and the fan driving means so that the drum and the fan are intermittently driven in an intermittent operation in a state that the heater is deenergized, after completion of the cooling step of the drying operation. Determining means is provided for determining whether a predetermined value indicative of a crease-preventing temperature has been reached during the intermittent operation, on the basis of the temperature signal from the temperature sensing means. The second control means includes means for terminating the intermittent operation when the determining means determines that the predetermined value has been reached.

In the above-described clothes dryer, the intermittent operation is executed after completion of the cooling step of the drying operation so that the clothes are kept soft for prevention of occurrence of creases, as in the prior art. The temperature in the drum is usually monitored by the temperature sensing means during the intermittent operation. Based on the temperature sensed by the temperature sensing means, the determining means determines whether the predetermined value indicative of the crease-preventing temperature has been reached during the intermittent operation. When the determining means determines that the predetermined value has been reached, the intermittent operation is terminated at the time of determination.

The completion time of the intermittent operation is determined on the basis of the time the predetermined value of the drum temperature necessary for preventing occurrence of creases has been reached. Consequently, since the period of the intermittent operation can be prevented from being excessively prolonged, waste of electrical energy and damage to the clothes can be prevented.

The predetermined value may represent the temperature sensed by the temperature sensing means or a rate of change of the temperature sensed by the temperature sensing means.

When the determining means determines that the predetermined value has been reached, the second control means may terminate the intermittent operation after a predetermined delay period that starts when the predetermined value is reached.

The second control means may terminate the intermittent operation when a period between commencement of the intermittent operation and attainment of the predetermined value, exceeds a predetermined monitoring period.

BRIEF DESCRIPTION OF THE DRAWINGS

Other objects, features and advantages of the present invention will become clear upon reviewing the following description of preferred embodiments thereof, made with reference to the accompanying drawings, in which.

DESCRIPTION OF THE PREFERRED EMBODIMENTS

Figure 1:
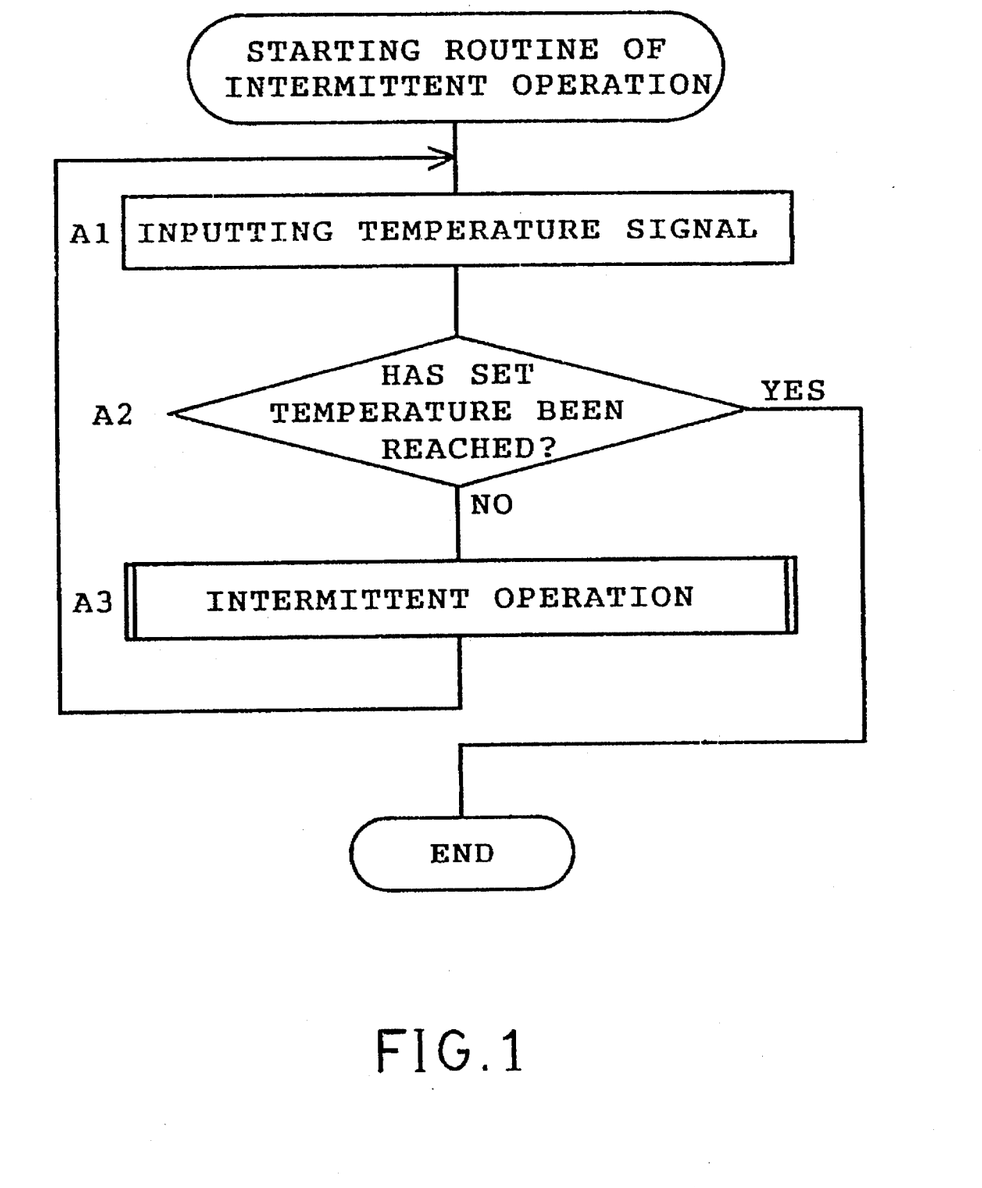
FIG. 1 is a flowchart for explaining the control manner of a control circuit employed in a first embodiment of a clothes dryer in accordance with the present invention.
Figure 2:
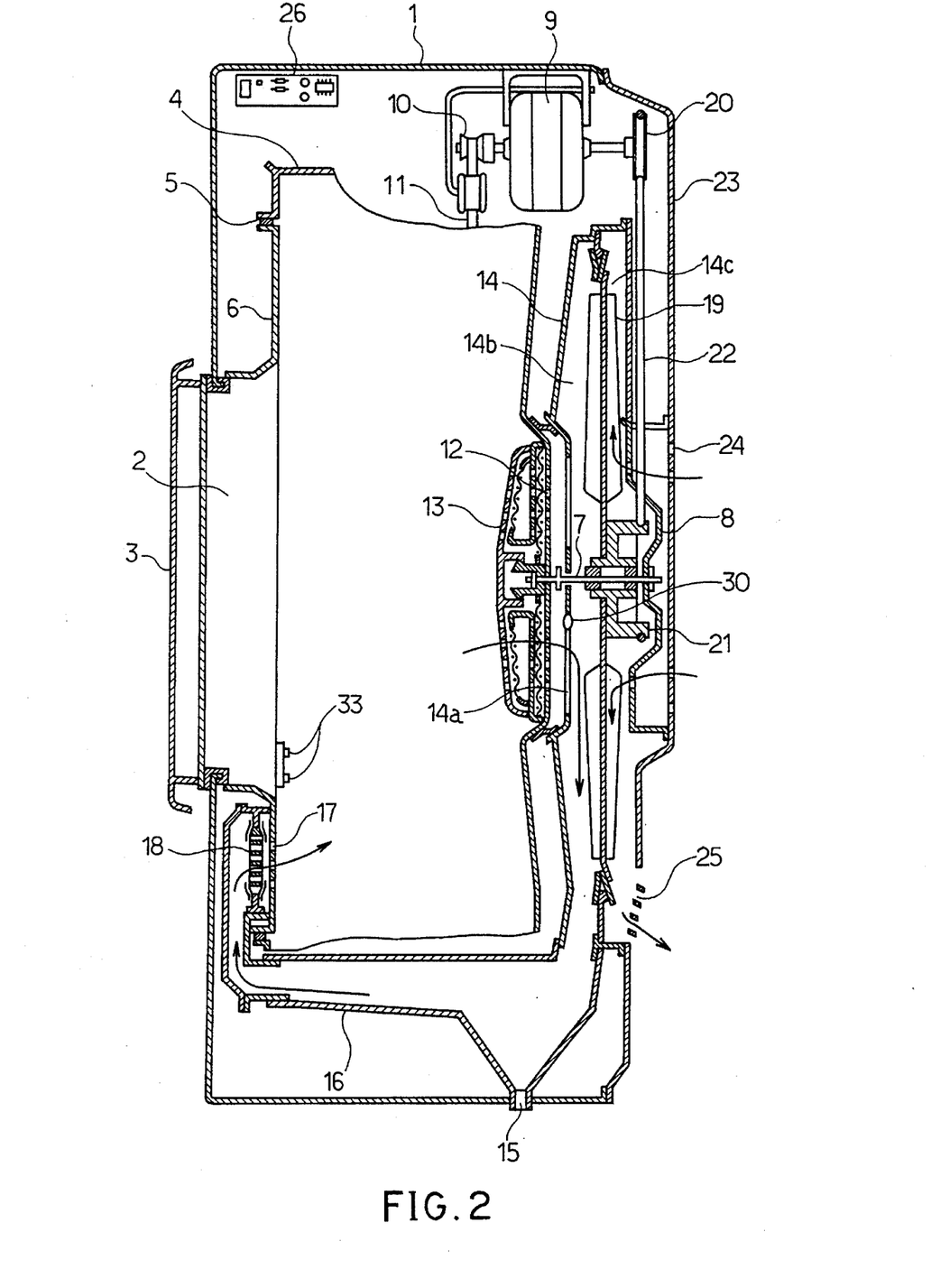
FIG. 2 is a longitudinally sectional side view of the clothes dryer.

A first embodiment of the present invention will be described with reference to FIGS. 1 to 7. Referring to FIG. 2, there is shown a clothes dryer in accordance with the invention. An outer casing 1 has an access opening 2 in the central front. A door 3 is mounted on the outer casing 1 for closing and opening the access opening 2. The outer casing 1 encloses therein a drum 4 having a large opening 5 formed in the front. The drum 4 is rotatably mounted at the front on a support member 6. The drum 4 further has a shaft 7 projecting from the central rear. The shaft 7 is rotatably mounted on a support plate 8 provided in the rear interior of the outer casing 1.

An electric motor 9 is mounted in the upper interior of the outer casing 1. A first pulley 10 is mounted on one end of a rotational shaft of the motor 9. A first belt 11 passes over the first pulley 10 and an outer periphery of the drum 4 so that the drum 4 is driven via the first belt 11.

The drum 4 has in its rear an air outlet 12 comprising a number of small holes. A filter 13 is provided in the interior of the drum 4 to cover the air outlet 12. A fan casing 14 is provided behind the drum 4 in the outer casing 1. The fan casing 14 has an air inlet 14a through which the air outlet 12 of the drum 4 communicates with the interior of the fan casing 14. The fan casing 14 communicates with a duct 16 having a drain hole 15 in its lower portion. The duct 16 communicates at its distal end with the interior of the drum 4 through an air inlet 17 comprising a number of small holes. A heater 18 is provided in the duct 16 so as to face the air inlet 17.

A fan 19 is provided in the fan casing 14 so as to partition the interior thereof into front and rear compartments 14b and 14c. The fan 19 is of a type having blades disposed in both partitioned chambers 14b, 14c respectively. The fan 19 serves to perform heat exchange between air discharged from the drum 4 and outside air as well as to supply air into the drum 4. A second pulley 20 is mounted on the other end of the rotational shaft of the motor 9. A second belt 22 passes over the second pulley 20 and a driven pulley 21 of the fan 19 so that the fan 19 is driven via the second belt 22. The motor 9 thus serves as means for driving both the drum 4 and the fan 19.

Upon rotation of the fan 19, air in the drum 4 is drawn into the front compartment 14b of the fan casing 14 through the air outlet 12, as shown by arrows in FIG. 2. The drawn air is then discharged into the duct 16. Furthermore, outside air is drawn into the rear compartment 14c of the fan casing 14 through an inlet 24 formed in the center of a rear plate 23 of the outer casing 1. The outside air is then discharged from the rear compartment 14c to the outside through an outlet 25 formed in the lower portion of the rear plate 23. Consequently, heat exchange is performed in the fan casing 14 between the air in the drum 4 and the outside air such that the air in the drum 4 is dehumidified. The dehumidified air is delivered through the duct 16 is then heated by the heater 18 so that hot air is supplied into the drum 4 through the air inlet 17.

Figure 3:
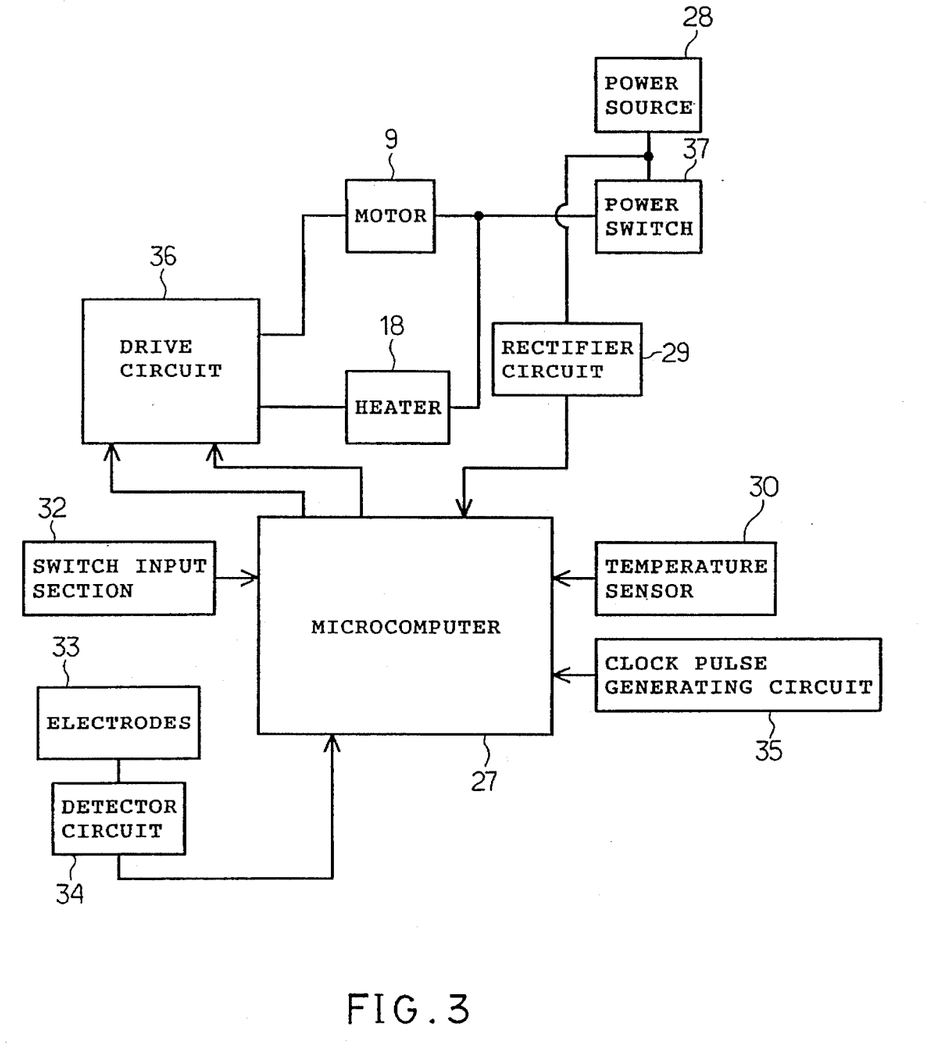
FIG. 3 is a block diagram schematically showing electrical arrangement of the clothes dryer.

FIG. 3 shows main component parts of a control circuit mounted on a circuit board 26 provided in the upper interior of the drum 4. A central microcomputer 27 controls various elements and further serves as determining means as will be described later. The microcomputer 27 is supplied with DC power from a power source 28 through a rectifier circuit 29. Furthermore, a temperature signal generated by a temperature sensor 30 serving as temperature sensing means is supplied to the microcomputer 27 as will be described later.

Figure 4:
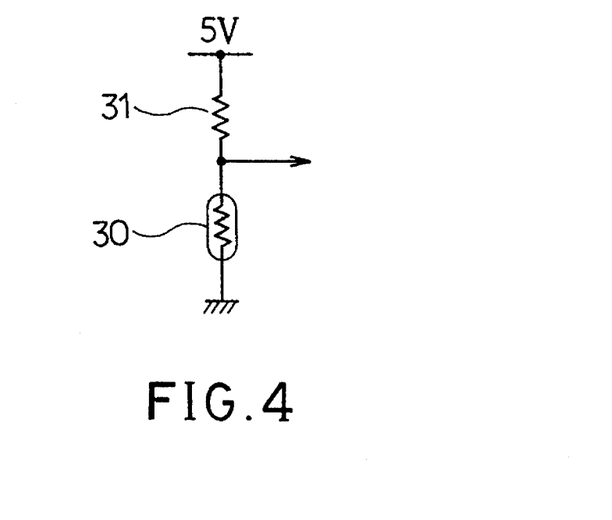
FIG. 4 is a connection diagram of a temperature sensor employed in the clothes dryer.
Figure 5:
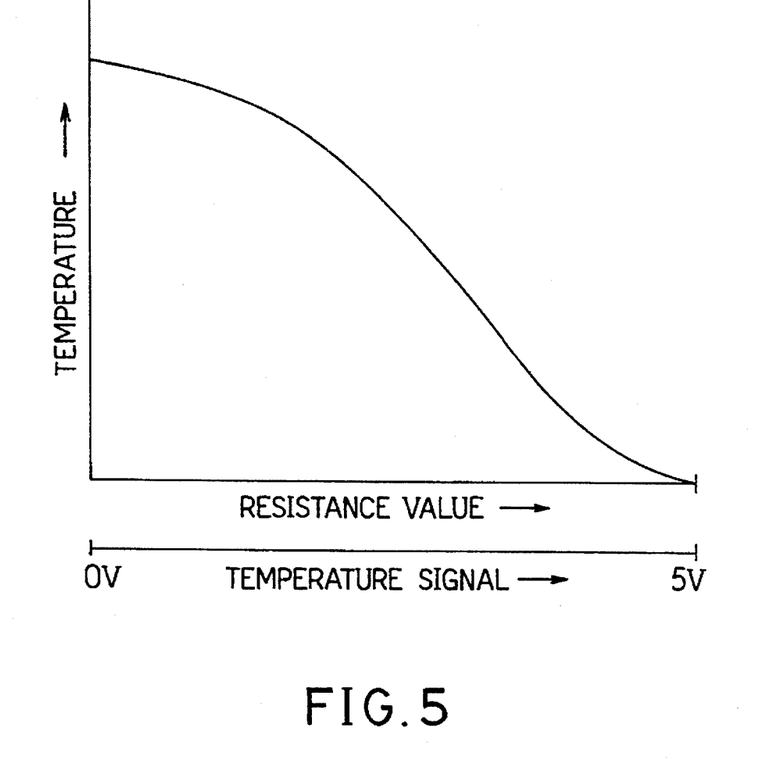
FIG. 5 is a graph showing the characteristic curve of the temperature sensor.

The temperature sensor 30 is disposed in the air inlet 14a of the fan casing 14 for sensing the temperature of air discharged from the drum 4 or the temperature in the interior of the drum 4, as shown in FIG. 2. The temperature sensor 30 comprises a resistor 31 and a thermistor connected in series to the resistor 31 as shown in FIG. 4. Since the value of resistance of the thermistor is changed in accordance with the temperature of the air flowing through the drum 4, a voltage signal or temperature signal supplied to the microcomputer 27 is in accordance with the resistance value of the thermistor, as well known in the art. FIG. 5 shows the relationship among the temperature sensed by the temperature sensor 30, the resistance value of the thermistor and the voltage of the temperature signal supplied to the microcomputer 27. As obvious from FIG. 5, as the sensed temperature is deceased, the resistance value of the thermistor becomes larger and the voltage of the temperature signal becomes higher. Furthermore, the microcomputer 27 is supplied with switch signals from various switches provided in a switch input section 32. Electrodes 33 are mounted on a lower portion of the support 6 so as to face the interior of the drum 4. A dryness signal indicative of a degree of dryness of the clothes is supplied from the electrodes 33 to the microcomputer 27 through a detector circuit 34. Clock pulses generated by a clock pulse generating circuit 35 are input to the microcomputer 27. Based on the above-described input signals and a previously stored control program, the microcomputer 27 delivers a drive control signal to a drive circuit 36 for driving the motor 9 and the heater 18. A power switch 37 is connected across a feed line common to the motor 9 and the heater 18.

The operation of the clothes dryer will now be described. In the drying step of the drying operation, both the motor 9 and the heater 18 are energized so that the drum 4 is rotated and the fan 19 is driven to supply hot air into the drum 4. The drying step 4 is continued for a predetermined period of time or until the dryness signal from the electrodes 33 reaches a predetermined value. A cooling step is executed subsequently to the drying step. In the cooling step, the fan 19 and the drum 4 are driven with the heater 18 deenergized. The drying operation is completed after the cooling step is executed for a predetermined period, for example, ten minutes.

After a predetermined period immediately following completion of the drying operation, an intermittent operation is initiated. In the intermittent operation, only the motor 9 is intermittently driven in the state that the heater 18 is deenergized, so that the drum 4 and the fan 19 are driven. In the intermittent drive for the intermittent operation, for example, a non-drive period of the drum 4 is set at five minutes and a drive period thereof is set at 10 seconds. This drive mode is repeated in the intermittent operation. Consequently, heat is radiated from the clothes in the drum 4 and the temperature in the drum 4 gradually drops. The microcomputer 27 inputs the temperature signal from the temperature sensor 30 (step A1). Based on the input temperature signal, the microcomputer 27 determines whether a set temperature for prevention of occurrence of creases, for example, has been reached. This set temperature is chosen so that the clothes can be kept soft with creases not occurring in the clothes and so that spontaneous firing does not occur even when the clothes are left in the drum 4 after completion of the intermittent operation (step A2).

Figure 6:
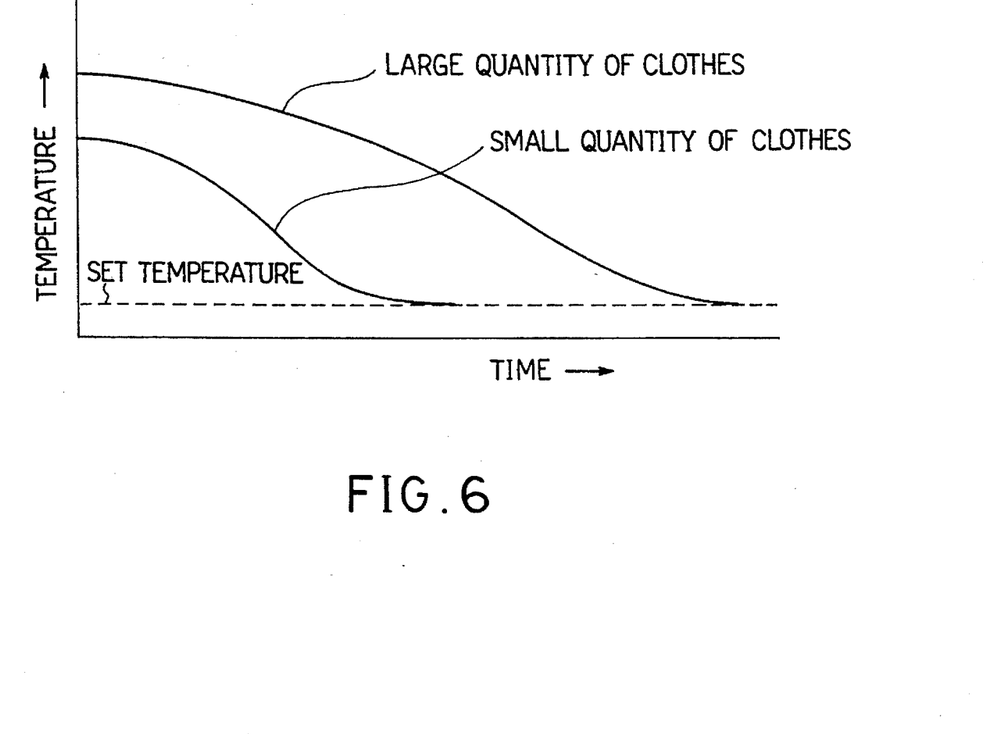
FIG. 6 is a graph showing the changes in the temperature in a drum over time during the intermittent operation with respect to different quantities of the clothes.
Figure 7:
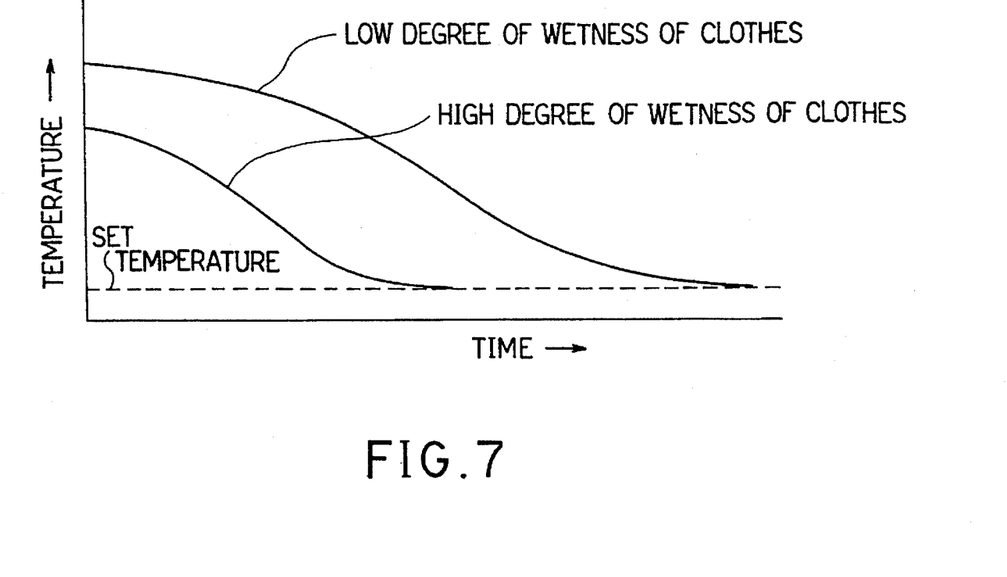
FIG. 7 is a graph showing the changes in the humidity in the drum over time during the intermittent operation with respect to different degrees of wetness of the clothes before they are dried.

FIG. 6 shows the changes in the temperature in the drum 4 over time during the intermittent operation with respect to different quantities of clothes. It takes a longer period of time for the predetermined crease-preventing temperature to be reached when the quantity of clothes is large than when the quantity of clothes is small. Furthermore, FIG. 7 shows the changes in the temperature in the drum over time during the intermittent operation with respect to different degrees of wetness of the clothes before they are dried. It takes a longer period of time for the predetermined crease-preventing temperature to be reached when the degree of wetness of the clothes is low than when the degree of wetness of the clothes is high. The reason for this is that a smaller quantity of heat is absorbed from the hot air when the degree of wetness of the clothes is low than when the degree of wetness is high and that the temperature in the drum 4 is increased.

When the microcomputer 27 determines at step A2 that the crease-preventing temperature has not been reached, the intermittent operation is continued (step A3). On the other hand, the intermittent operation is terminated when the crease-preventing temperature has been reached (step A2).

According to the above-described embodiment, the intermittent operation starts after completion of the drying operation. The intermittent operation is completed when it is determined that the temperature in the drum 4 has dropped to the crease-preventing temperature. Consequently, the creases can be prevented from being caused in the clothes when they are left in the drum after completion of the intermittent operation, and spontaneous firing of the clothes can be prevented. Thus, since the period of the intermittent operation can be reduced to a minimum, waste of electrical energy and damage in the clothes can be prevented.

Figure 8:
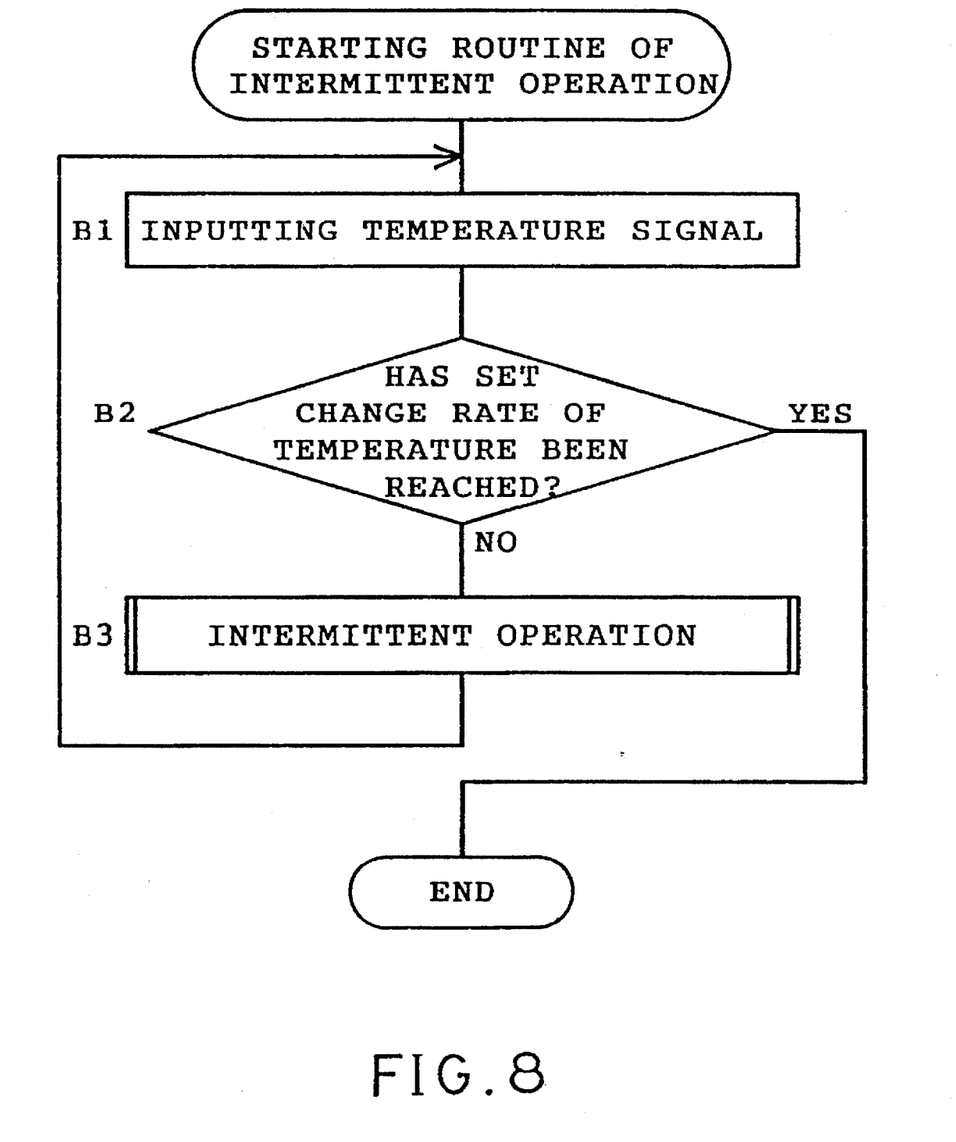
FIG. 8 is a view similar to FIG. 1 showing a second embodiment of a clothes dryer in accordance with the present invention.
Figure 9:
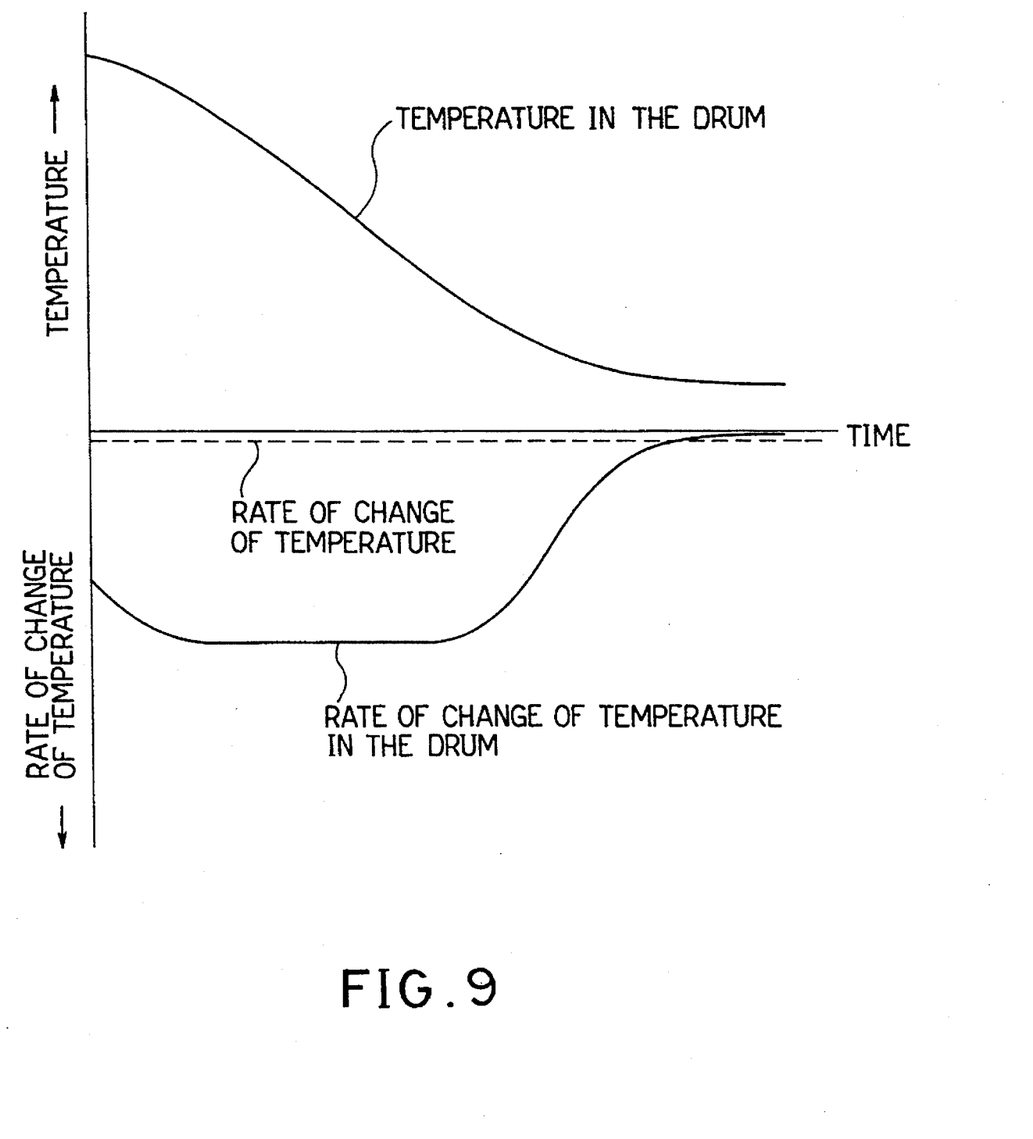
FIG. 9 is a graph showing the changes in the temperature in the drum and its rate of change over time during the intermittent operation.

FIGS. 8 and 9 illustrate a second embodiment of the invention. Although the temperature in the drum 4 is sensed and termination of the intermittent operation is determined on the basis of the sensed temperature in the foregoing embodiment, a rate of change of the temperature in the drum 4 is detected for the purpose of terminating the intermittent operation in the second embodiment.

FIG. 9 shows the changes in the temperature in the drum and its rate of change over time during the intermittent operation. As obvious from FIG. 9, the rate of change of the temperature in the drum 4 is reduced as the temperature therein drops. The intermittent operation is terminated when it is determined at step B2 that the rate of change of the temperature in the drum 4 has reached a predetermined value.

Figure 10:
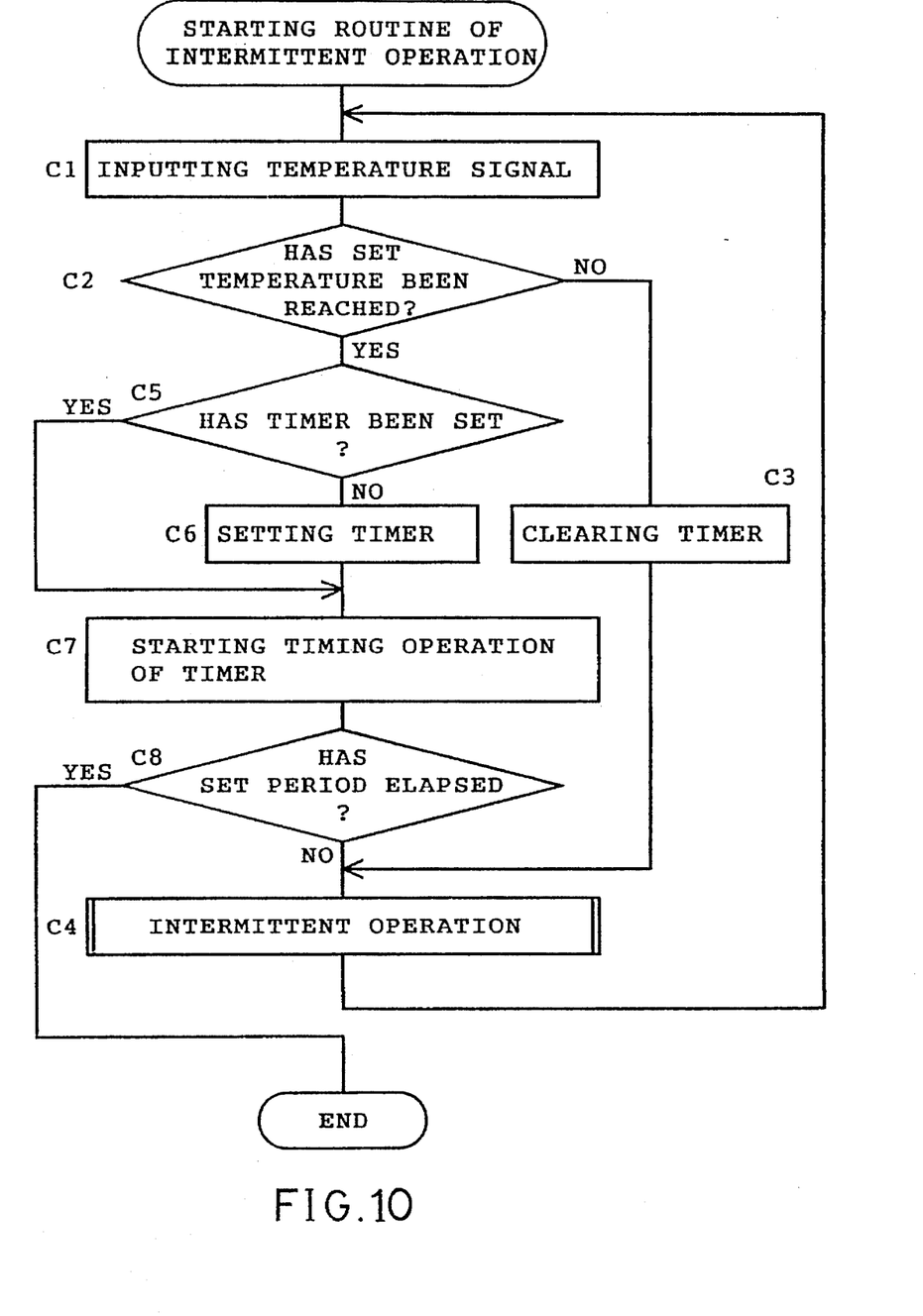
FIG. 10 is a view similar to FIG. 1 showing a third embodiment of a clothes dryer in accordance with the present invention.

FIG. 10 illustrates a third embodiment of the invention. When it is determined at step C2 that the temperature in the drum 4 has not reached the crease-preventing temperature, a timer provided for measuring a predetermined delay period of time is cleared (step C3) and the intermittent operation is initiated (step C4). When it is determined that the crease-preventing temperature has been reached, it is determined whether the timer has been set (step C5). When it is determined that the timer has not been set (step C5), the timer is set for a set delay period of time (step C6). When it is determined that the timer has been set (step C5), the timer starts its measuring operation (step C7). Thereafter, it is determined whether the set delay period of time has elapsed (step C8). When it is determined that the set delay period of time has not elapsed, the intermittent operation is continued (step C4). The intermittent operation is terminated when it is determined that the set delay period of time has elapsed.

According to the third embodiment, the intermittent operation is not terminated immediately when the crease-preventing temperature has been reached. The timer is operated when the crease-preventing temperature has been reached. The intermittent operation is terminated upon lapse of the delay period of time set at the timer. Consequently, insufficiency of the cooling due to slight false temperature detection or temporary change in the temperature can be prevented. In the third embodiment, too, termination of the intermittent operation may be determined on the basis of the rate of change in the temperature in the drum 4 instead of the temperature in the drum 4.

Figure 11:
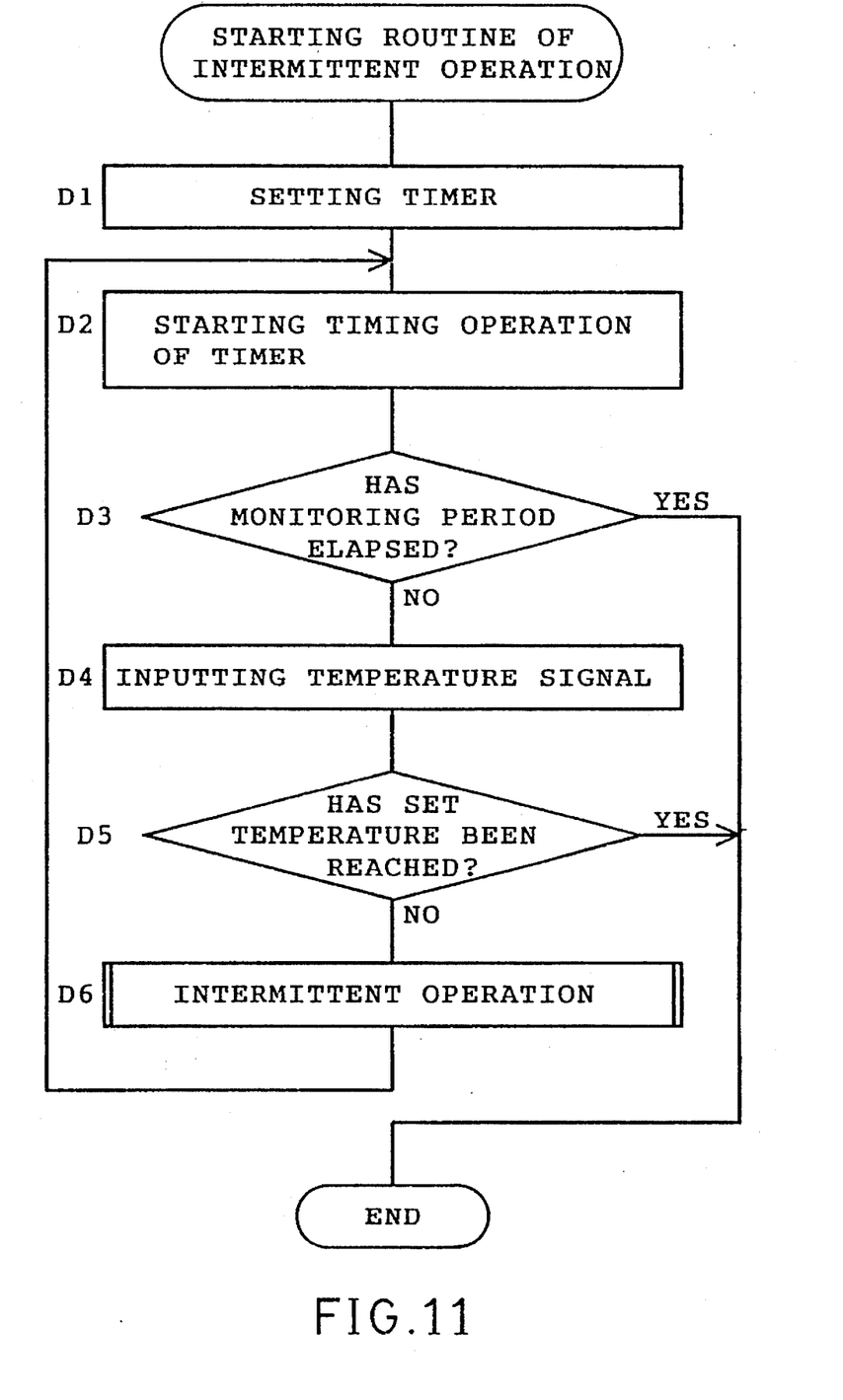
FIG. 11 is a view similar to FIG. 1 showing a fourth embodiment of a clothes dryer in accordance with the present invention.

FIG. 11 illustrates a fourth embodiment of the invention. Upon start of the intermittent operation, a timer provided for measuring a predetermined monitoring period of time is set (step D1). Thereafter, the measuring operation of the timer is initiated (step D2). It is determined whether the predetermined monitoring period of time has elapsed (step D3). When determining at step D3 that the monitoring period of time has not elapsed, the microcomputer 27 advances sequentially to steps D4–D6 which are identical with steps A1–A3 in FIG. 1 respectively. The intermittent operation is terminated when it is determined that the monitoring period of time has elapsed.

According to the fourth embodiment, occurrence of an abnormal condition such as abnormal generation of heat from the heater can be considered when the crease-preventing temperature has not been reached within the monitoring period of time after start of the intermittent operation. In such a case, the intermittent operation is terminated upon lapse of the monitoring period of time. Consequently, safety in use of the clothes dryer can be improved. In the fourth embodiment, too, termination of the intermittent operation may be determined on the basis of the rate of change in the temperature in the drum 4 instead of the temperature in the drum 4.

In each of the foregoing embodiments, the clothes dryer may be provided with means for compensating the set temperature or the set rate of change in the temperature for terminating the intermittent operation in accordance with the temperature in a room where the clothes dryer is installed.

The foregoing disclosure and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A clothes dryer comprising:

an outer casing;

a drum rotatably mounted in the outer casing for accommodating therein clothes to be dried;

drum driving means for driving the drum;

a fan for providing a flow of air flowing through the interior of the drum;

fan driving means for driving the fan;

a heater for heating the air supplied into the drum by the fan;

temperature sensing means for sensing the temperature in the drum and generating a temperature signal indicative thereof;

first control means for controlling the drum driving means, the fan driving means and the heater during a drying operation so that the drum and the fan are operated in a drying mode wherein the heater is energized and so that, after drying mode operation, the drum and the fan are driven for a predetermined period of time in a cooling mode wherein the heater is deenergized;

second control means for controlling the drum driving means and the fan driving means so that, after completion of the cooling mode of the drying operation, the drum and fan are intermittently driven in an intermittent operation while the heater is deenergized; and determining means for determining whether a predetermined value indicative of a crease-preventing temperature has been reached during the intermittent operation, on the basis of the temperature signal from the temperature sensing means, the second control means including means for terminating the intermittent operation when the determining means determines that the predetermined value has been reached.

2. A clothes dryer according to claim 1, wherein the predetermined value represents the temperature sensed by the temperature sensing means.

3. A clothes dryer according to claim 1, wherein the predetermined value represents a rate of change of the temperature sensed by the temperature sensing means.

4. A clothes dryer according to claim 1, wherein the second control means terminates the intermittent operation after a predetermined delay period that starts when the predetermined value is reached.

5. A clothes dryer according to claim 1, wherein the second control means terminates the intermittent operation when a period, between commencement of the intermittent operation and attainment of the predetermined value, exceeds a predetermined monitoring period.

* * * * *